United States Patent Office 3,682,831
Patented Aug. 8, 1972

3,682,831
METHOD OF AND COMPOSITION FOR THE PREVENTION OF SCALE
Jack F. Tate, Houston, Tex., assignor to Texaco Inc., New York, N.Y.
No Drawing. Filed Dec. 16, 1969, Ser. No. 885,644
Int. Cl. C23f *14/02*
U.S. Cl. 252—180                                 8 Claims

ABSTRACT OF THE DISCLOSURE

Method of and composition for the prevention of scale, particularly calcium sulfate scale, using a water soluble glycol-silicone copolymer of a prescribed formula having a molecular weight in the range of from about 458 to about 1148.

---

This invention relates to a composition useful in treating oil and gas wells and to a method of using such composition for such treatment. More particularly, this invention is directed to a composition and method useful in the prevention and/or inhibition of the build-up of undesirable inorganic mineral scale deposits in oil and gas wells, their flow lines, auxiliary producing equipment, such as heat exchangers and cooling towers, as well as the producing strata in the vicinity of the well bore. Additionally, the invention is useful in the prevention and/or inhibition of build-up of scale deposits in aqueous systems susceptible to mineral scale formation.

The formation of objectionable scale deposits, such as calcium or barium sulfate is rather widespread in certain producing areas, and has been attributed to several causes. One generally accepted theory of scale formation is that of chemical precipitation resulting from the commingling of two fluid streams each of which contains a concentration of a particular ion such that when they commingle an unstable water is produced. For example, in the case of calcium sulfate scale formation, one stream contains sulfate ions, and the other calcium ions in such concentration so as to produce an unstable water. The mixing of these streams may result in the deposition of a hard crystalline calcium sulfate deposit which gradually builds up on the walls of the well tubing, for example, to a point where it may choke off fluid flow in the tube if remedial measures were not undertaken.

Another cause of the scale formation is attributed to the precipitation of scale material from potentially supersaturated solutions thereof. When the operating variables of temperature and pressure change adversely, thus reducing the solubility of the salt in solution, or solvent is allowed to evaporate, thus concentrating the solution, precipitation of the salt on the tubing and surrounding strata occurs.

The use of strong alkali solutions for the removal of sulfate scale has been proposed. It has been claimed that under certain favorable conditions of temperature and time, concentrated alkali solutions will, in some cases, provide a break-up of the built-up scale after relatively long periods of treatment. If, for example, a calcium sulfate scale is treated with concentrated potassium hydroxide for comparatively long periods of time, say from 24 to 72 hours, it has been claimed that a white fluffy precipitate of calcium hydroxide will be formed. This deposit of precipitate may then be removed by suitable mechanical means. Such a method is obviously undesirable in that considerable periods of time are involved and the use of mechanical apparatus is expensive, and in some cases, either undesirable or mechanically impossible. Moreover, strong alkali is not effective in preventing or inhibiting the build-up of scale deposits in well tubing, production equipment and the producing strata about the bore hole.

It is, accordingly, an object of the invention to provide a method of inhibiting and/or preventing the build-up of scale deposits in gas and oil flow lines, auxiliary equipment, well tubing and the surrounding subsurface strata.

A further object is to provide a scale treating composition for use in preventing the build-up of scale deposits in the well tubing, producing equipment, the bore hole and surrounding strata.

A still further object of this invention is to provide a method of and composition for the treatment of gas and oil well tubing and the like containing sulfate scale therein to prevent and/or inhibit the build-up of further scale deposits in the tubing.

These as well as other objects are accomplished according to the present invention which comprises a scale prevention and/or inhibition composition comprising a water soluble glycol-silicone copolymer having a molecular weight range of from about 458 to about 1148, particularly a molecular weight of from about 458 to about 760 and having the general formula

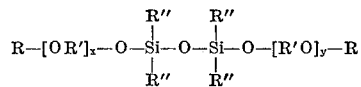

wherein R is a $C_1$–$C_4$ alkyl radical, R' is an ethylene or propylene radical, R'' is a methy or ethyl radical, and $x$ and $y$ each is a number from 3 to 7. Representative glycol-silicone copolymers include methyltriethoxydi(dimethylsiloxy)triethoxymethane,
2-ethyltetrapropoxydi(methylethylsiloxy)pentaethoxypropane,
1-isobutyltriethoxydi(diethylsiloxy)hexapropoxyisobutane and
2-isopropylpentaethoxydi(dimethylsiloxy)pentapropoxypropane.

The above described copolymer can be prepared by the method disclosed in U.S. Pat. 3,402,192, issued Sept. 17, 1968.

The invention also comprises a method of treating water contacting equipment susceptible to the development of scale deposits therein such as water storage tanks and the like, particularly oil field equipment, using the scale prevention composition.

In carrying out one aspect of the present invention the method thereof comprises introducing the scale prevention composition into the equipment to be protected, such as oil well tubing, in the form of an aqueous solution in an amount sufficient to provide the copolymer therein at a concentration of from about 0.001 to about 0.02% by weight and maintaining the scale treating composition in contact therewith for a time sufficient to prevent and/or inhibit the development of scale deposits or additional scale deposits therein. It is desirable to circulate the scale prevention composition through the system to provide adequate contact of the composition with the surfaces to be protected. Underground strata surrounding the well bore can be treated in a like manner, i.e. by passing the solution into said strata such as by injection of the solution down through the bore hole or production tubing, preferably under pressure.

The scale prevention composition of the present invention is preferably used in an amount sufficient to provide to the treating solution the glycol-silicone copolymer in an amount of from about 0.002 to about 0.01% by weight. Higher concentrations (above about 0.02%) do not provide improved scale protection.

A more complete understanding of the invention will be obtained from the following illustrative examples.

The following procedure was used in the evaluations.

A 1000 milliliter glass beaker was provided with sufficient calcium sulfate and sodium chloride, obtained by mixing solutions of calcium chloride and sodium sulfate, to produce an aqueous concentration thereof of 10,000 parts per million of calcium sulfate and 50,000 parts per million of sodium chloride. A preweighed metal rotor attached to an externally provided mechanical stirring device was immersed in the test solution for a 24 hour time period. The solution was maintained at a temperature of 104° F. during the test period. At the end of the 24 hours, the rotor was removed from the solution and from the stirrer, the scale deposited thereon removed, dried and weighed. In all, several tests were conducted on each material being evaluated and the average of the tests was taken as the amount of scale deposit. The above laboratory test procedure affords good correlation between the results thereby obtained and larger scale field evaluations of scale preventing compositions.

The following table records the results of the tests.

TABLE

| Example | Additive | Average weight of scale (grams), amount of additive (p.p.m.) | |
|---|---|---|---|
| | | 0 | 20 |
| Control | | 0.61 | |
| 1 | A [1] | | 0.01 |

[1] Additive A is 2-isopropylpentaethyoxydi(dimethylsiloxy) pentapropoxypropane having a viscosity at 77° F. of 1,000–1,500 centistokes, a specific gravity at 77° F. of 1.035, a refractive index at 77° F. of 1.4480, a pour point of −40° F., and an average silicon content of 6.125% by gravimetric analysis.

From the data present in the above table, it is evident that the glycol-silicone copolymers of the present invention are effective calcium sulfate scale inhibitors at low concentrations.

Obviously, other modifications and variations of the invention as hereinbefore set forth may be made without departing from the spirit and scope thereof and therefore only such limitations should be imposed as are indicated in the appended claims.

I claim:
1. A method of controlling the build-up of scale deposits in an aqueous system which comprises incorporating in said system a scale treating composition consisting essentially of a water soluble glycol-silicone copolymer having a molecular weight in the range of from about 458 to about 1148 and having the general formula

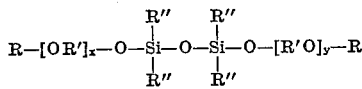

wherein R is a $C_1$–$C_4$ alkyl radical, R' is an ethylene or propylene radical, R'' is a methyl or ethyl radical, and $x$ and $y$ each is a number from 3 to 7, said copolymer being used in an amount of from about 0.001 to about 0.02% by weight and being sufficient to inhibit the development of scale in said system.

2. Method as claimed in claim 1 wherein said copolymer is methyltriethoxydi(dimethylsiloxy)triethoxymethane.

3. Method as claimed in claim 2 wherein said copolymer is 2 - ethyltetrapropoxydi(methylethylsiloxy)pentaethoxypropane.

4. Method as claimed in claim 1 wherein said copolymer is 1-isobutyltriethoxytripropoxydi(diethylsiloxy)hexapropoxyisobutane.

5. Method as claimed in claim 1 wherein said copolymer is 2 - isopropylpentaethoxydi(dimethylsiloxy)pentapropoxypropane.

6. A scale inhibiting composition comprising an aqueous solution of a water soluble glycol-silicone copolymer having a molecular weight in the range of from about 458 to about 1148, and having the general formula

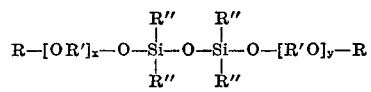

wherein R is a $C_1$–$C_4$ alkyl radical, R' is an ethylene or propylene radical, R'' is a methyl or ethyl radical, and $x$ and $y$ each is a number from 3 to 7, said treating composition being used in an amount of from about 0.001 to about 0.02% by weight and being sufficient to inhibit the development of scale in said system.

7. A scale inhibiting composition as claimed in claim 6 wherein said copolymer is 2 - isopropylpentaethoxydi(dimethylsiloxypentapropoxypropane.

8. A scale inhibiting composition as claimed in claim 6 wherein said copolymer is methyltriethoxydi(dimethylsiloxy)triethoxymethane.

References Cited
UNITED STATES PATENTS

| | | | |
|---|---|---|---|
| 3,402,192 | 9/1968 | Haluska | 260—448.2 |
| 3,265,623 | 8/1966 | Pines | 252—75 |
| 3,505,237 | 4/1970 | Steinhauer | 252—180 |

ROBERT F. BURNETT, Primary Examiner

M. E. McCAMISH, Assistant Examiner

U.S. Cl. X.R.

21—2.7; 134—2, 22; 210—58; 252—8.55 B; 260—2 S, 46.5 Y, 448.2 B